Dec. 14, 1948.　　　　　B. F. BAILEY　　　　　2,456,242
DIRECTIONAL SIGNAL AND CIRCUITS THEREFOR
Filed Sept. 25, 1944
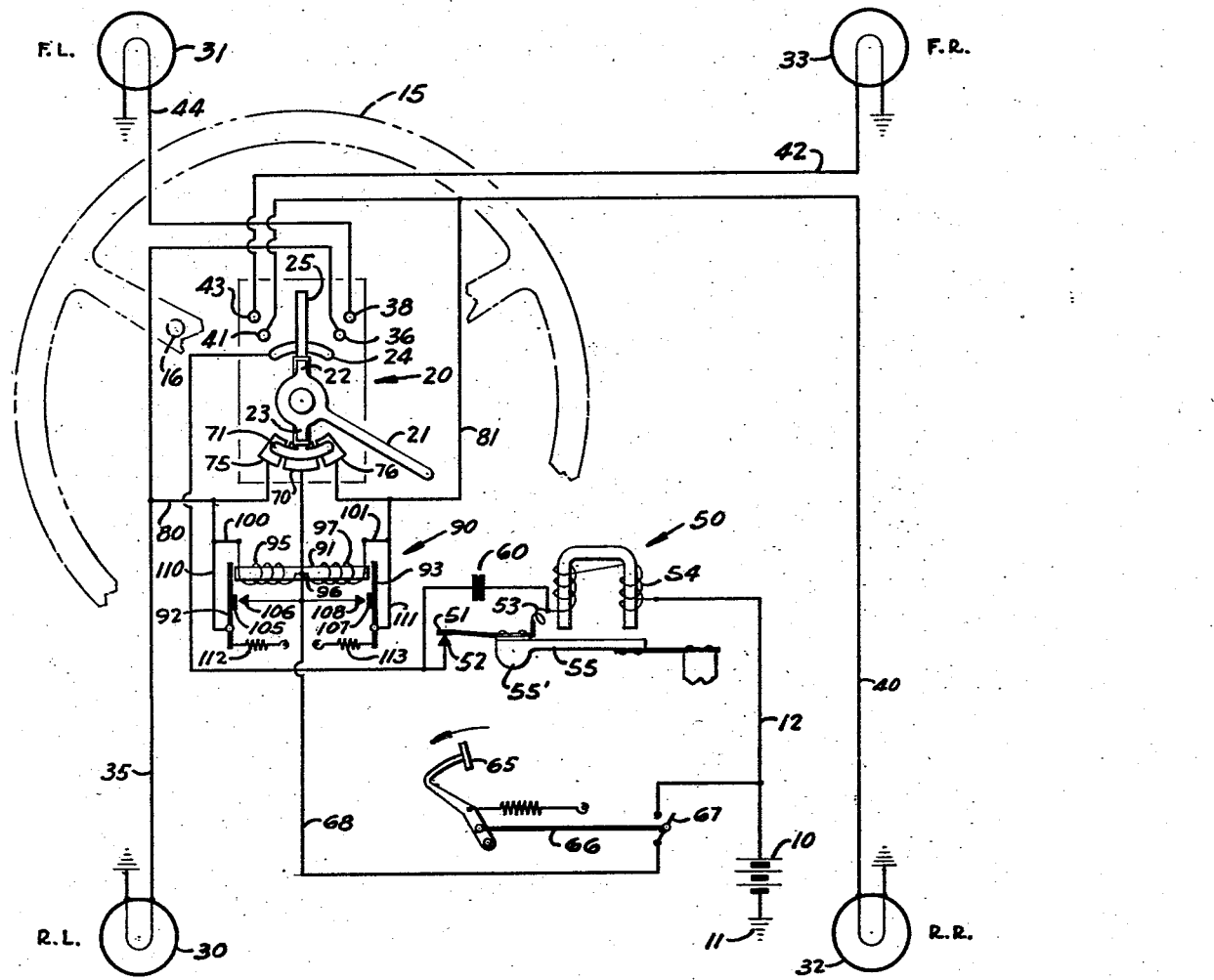
INVENTOR.
Benjamin F. Bailey
BY
ATTORNEY Patented Dec. 14, 1948

2,456,242

UNITED STATES PATENT OFFICE 2,456,242

DIRECTIONAL SIGNAL AND CIRCUITS THEREFOR

Benjamin F. Bailey, Ann Arbor, Mich., assignor to United Lens Corporation, Detroit, Mich., a corporation of Delaware Application September 25, 1944, Serial No. 555,717

9 Claims. (Cl. 177—337)

1

This invention relates to improved circuits and circuit control means therefor for directional signals on motor vehicles in combination with warning signals, tail lamps, and stop lights and has for its object to provide a simplified directional system in which a single flasher is provided for the various positions of the control in combination with the operation of the tail lamps and stop signal devices, switches, and controls thereof particularly in combination with a safety shunting circuit to insure proper operation of the stop signal circuits of the vehicle should the brake pedal connections not properly operate.

Further objects and advantages are within the scope of this invention such as relate to the arangement, operation and function of the related elements of the structure, to various details of construction and to combinations of parts, elements per se, and to economies of manufacture and numerous other features as will be apparent from a consideration of the specification and drawing of various forms of the invention, one of which may be preferred, in which:

The figure is a diagrammatic illustration of an embodiment of my invention in which I provide automatic means to shunt the manually controlled switch in case of a defect in the connections when the brake pedal stop signal switch is operated.

Referring to the drawing, the battery 10 is grounded at 11 as shown, it being understood that the battery 10 is charged by the generator connected thereto by a suitable relay on an automobile and therefore that 10 represents a source of electrical energy for the signaling systems. The steering wheel of the vehicle is indicated at 15 and on this steering wheel or the supporting column thereof is mounted the manually settable, automatically releasable directional signal switch indicated generally by the reference numeral 20. This switch has a handle 21 rotatable around the steering column of the motor vehicle and handle 21 carries extensions 22 and 23, each extension supporting insulated switch contacting elements for establishing the circuits hereinafter set forth.

I have illustrated directional signal illuminating means in the form of incandescent bulbs 30 and 31 located on the rear and front left side portions of the vehicle and 32 and 33 located at the rear and front of the right side of the vehicle. A lead 35 connects the bulb 30 with a terminal 36 of the switch mechanism. Likewise lead 40 connects filament 32 with a contacting terminal 41 and lead 42 connects filament 33 with contact

2

43. A lead 44 connects filament 31 with terminal 38 as shown.

From the battery 10, leads 12 and 13 connect the source of energy with an arc-shaped terminal 24 for connection with the proper illuminating means to indicate directional turn of the vehicle. Interposed between the leads 12 and 13 is an automatic flashing device indicated generally by the numeral 50. This device includes the make and break contacts 51 and 52, 52 being connected with the wire 13 leading to the main control switch 20, while the other contact 51 is connected through flexible connector 53 with coil 54, with lead 12 and battery 10, the coil thereby being in series with the source of energy 10. The armature 55 of the device is weighted as indicated at 55' so as to reduce the periodicity of the action of the make and break, the armature being so mounted as to move toward and away from the core of the coil 54. The armature 55 carries the make and break contact 51 with it as indicated so that as the coil 54 is alternately energized and deenergized, a make and break in the circuit at 51 and 52 occurs, the weight of the arm 55 returning the contact 51 to closed position.

Bridging the contacts 51 and 52, I have provided a condenser 60 to not only prevent arcing, and hence deterioration of the points 51 and 52, but also as a means in which energy is stored and returned to the system in the operation of the mechanism.

It will be understood that the extension 22 carries a bridging electrical conductor 25 for bridging the arc shaped terminal 24 with either contacts 36 and 38 or 41 and 43 depending on the position of the switch 20.

The brake pedal of the motor vehicle is indicated at 65 and has a pivotally connected rod 66 for controlling a switch 67 which connects the source of energy 10 with the stop signals of the motor vehicle. To this end the lead 68 is connected to a terminal block 70 and the extension 23 of switch 20 has a cooperating insulated arc-shaped switch plate 71. In normal position for switch 20, the switch blade 71 connects both rear filaments 30 and 32 with the source of energy 10 to form a non-flashing stop signal at both sides of the car in the rear if switch 67 be closed by an operation of the brake pedal 65. When the switch 20 is moved to either one of its right hand or left hand settable positions, the sweeping contact 71 will bridge the other rear stop signal filament (left hand) 30 or (right hand) 32 as the case may be. To this end, terminals 75 and 76 are connected by leads 77 and 78 with leads 49 and 35 which, in turn, are connected with the filaments 30 and 32 at the rear of the vehicle. Specifically, lead 77 connects terminal 75 with terminal 41 while on the other side lead 78 connects terminal 76 with terminal 36, 41 being connected with 40 as stated and 36 being connected with 35 as indicated.

It is understood that the steering wheel 15 has a depending finger 16 adapted to contact the handle 21 of the control switch and automatically return the same to neutral position, after it is moved to the right or to the left as the case may be. This is done when the vehicle has completed the turn.

Finger 16 as a cut off may be replaced by an apparatus surrounding the steering column which maintains the energization of the directional signal as long as the steering wheel is not turned backward in a direction to straighten out the wheels, as upon the completion of a turn.

In the operation of the system, when the switch 20 is in normal position an operation of the brake pedal will cause a non-flashing signal to be indicated at both rear filaments 30 and 32. To make a left hand turn, the operator turns the handle 21 of the switch 20 to the left. In this case switch contact 25 connects terminal 24 with contacts 36 and 38, which in turn connect the same with the filaments 30 and 31 on the left hand side of the vehicle. Arc-shaped contact 24 being connected through leads 13 and 12 to the battery, energy is supplied through the flashing device 50, and both filaments 30 and 31 will give a flashing periodically interrupted signal to indicate that the driver is turning toward the left. When the high point of the turn has been reached, the wheel 15 will be so turned that the finger 16 will contact the handle 21 returning it to normal position. The wheel is then straightened out. Thereafter, when a turn is desired to be made to the right, the operator moves the handle 21 to the right so that contact 25 now bridges contact 24 to connect the same with contacts 43 and 41 which, in turn, energizes the filaments 32 and 33, the current likewise passing through the flasher 50 and the operation on the right hand side is repeated.

In connection with the flashing device or interrupter relay 50, attention is called to the fact that I employ the condenser 60 across the breaker points 51 and 52 not only to prevent arcing but as an element of the combination of the present invention in which I also have in mind other types of interrupters which may well be employed and in which the condenser 60 is also used. When a break occurs at the points 51 and 52 even in a 6-volt system on an automobile, the induced voltage in the strong magnetic eld in the air gap and in the iron of the magnetic circuit may run as high as 30 to 50 volts, and of course, is in a direction to try and keep the current flowing, which might arc across the breaker points. By connecting the condenser 60 across the points, a new path for the current resulting from the relatively high induced voltage surges into the condenser and the energy of the magnetic field is thus stored therein and thereupon returned to the system instead of being wasted in arcing at the breaker points.

In the embodiment illustrated in the drawing, I have also provided an arrangement to insure operation of the stop signal illuminating means 30 and 32 at the rear of the car whenever the brake pedal is depressed to close the switch 67, notwithstanding any possible condition of the switch member 71 in so far as the contacts at 75 and 76 are concerned, as by poor contacts, careless operation, etcetera. In other words, if, for any reason, the operation of the switch 20 results in a poor contact or open circuit from the live wire 68 to either of the switch blocks 75 or 76 (which might otherwise interfere with proper operation of the filaments 30 and 32) I provide means to establish a stop signal circuit under all such improper operating conditions. To this end, I provide a relay 90 having a core 91 and a pair of high speed vibrators 92 and 93 located at opposite ends of the core 91 as indicated. These vibrators are polarized for purposes that are hereinafter set forth.

A winding 95 is connected with lead 68 at 96 on the left hand side of the core 91 and a similar winding 97 connected with the lead 68 at 96 is located on the right hand side of the core as shown. A lead 100 connects the end of the winding 95 with lead 80 and lead 101 connects the winding 97 with lead 81. Each of the vibrators has a pair of interrupter contacts 105 and 106, one set on the left hand side and 107 and 108 on the right hand side. A lead 110 connects vibrator 92 at its pivot with the lead 80, and a connection 111 connects vibrator 93 with lead 81.

Thus I have provided in the arrangement of the drawing a system which, when the brake pedal 65 is depressed and switch 67 closed operates as follows:

Assuming that the switch 20 is in such a position that the switch blade 71 is supposed to connect together contacts 70 and 75, but this contact, for some reason or other, is imperfect or is broken altogether. Therefore, instead of the current going as it normally would through lead 68, the contact 70, and switch blade 71, contact 75, and then by the way of wires 80 and 35 to the left hand light 40, it will instead be forced to flow through lead 68, the winding 95 of the relay and through wire 100 to 80, thus energizing the magnet of the relay and drawing the left hand vibrator blade 92 toward it. This action closes the contacts 105 and 106, and current can then flow through lead 68, contacts 105 and 106, the blade 92 and by the wire 110, 80, and 35 to the lamp 30.

However, as soon as the points 105 and 106 are in contact, there is a low resistance path through the vibrator blade 92, wire 110, and consequently, practically all of the current will flow through this circuit and not through the winding 95. The magnet will consequently lose its magnetism, and the vibrator blade will move back to the original position due to spring 112. This action will be repeated rapidly and while the current through the lamp 30 will be a fluctuating one, it will have the effect of being similar to a continuous current.

At the same time, a similar action will be taking place with respect to the lamp 32, that is, current will pass through the winding 97 of the relay attracting the vibrator blade 93 and closing the contacts 107 and 108, thus allowing current to flow from 68 through these contacts to the vibrator blade 93, the wires 111, 81, and 40, to the lamp 32. As before, however, as soon as the current finds this easy path, it will cease to flow through the wire 97, the magnet will lose its magnetism, and the contacts will open due to the spring 113. This will be rapidly repeated, and the current through the lamp 32 will also be rapidly fluctuating giving practically the effect of a continuous current.

It will be understood that if the switch blade 71 is shifted to the right under the conditions named, and is intended to connect terminal 76 with contact 76 which contact produces a poor, improper, or broken connection, the operation just described upon the assumption of the blade 71 being shifted to the left will be duplicated.

It is apparent that, within the scope of the invention, modifications and different arrangements may be made other than is herein disclosed, and the present disclosure is illustrative merely, the invention comprehending all variations thereof.

What I claim is:

1. In a motor vehicle signalling system, spaced illuminating directional signal means on an end of a motor vehicle, a source of energy therefor; circuits therebetween; a manually settable and automatically releasable switching means in said circuits for both of said directional signal means; a stop signal circuit controlled by the brake pedal of the motor vehicle connected with said illuminating means and controlled by said manually settable switch; single electroresponsive flashing means between said source and said directional switching means; means to retard the fluctuation of said flasher to prevent fluttering; and an electroresponsive means associated with said brake pedal circuit for automatically shunting said stop signal circuit around said manually settable switch said last mentioned means operable upon an abnormal voltage drop at the contacts of said manual switch.

2. In a motor vehicle signalling system, spaced illuminating directional signal means on an end of a motor vehicle, a source of energy therefor; circuits therebetween; a manually settable and automatically releasable switching means in said circuits for both of said directional signal means; a stop signal circuit controlled by the brake pedal of the motor vehicle connected with said illuminating means and controlled by said manually settable switch; single electroresponsive flashing means between said source and said directional switching means, means to retard the fluctuation of said flasher to prevent fluttering; and an electroresponsive means associated with said brake pedal circuit for automatically shunting said stop signal circuit around said manually settable switch, said last mentioned means operable upon a defective connection in said stop signal circuit through said manually settable switch.

3. In a vehicle, two spaced directional signals and two spaced stop signals both sets located at the rear of said vehicle; a circuit connections from a source of power to each of said signals; a manually settable, automatically releasable directional circuit switch comprising a movable central member; conducting means thereon to connect said source of power with either of said directional signals; a contact piece carried by said member; a terminal connected with said source of power; a plurality of fixed terminals, one connected with one of said stop signals and the other with the other stop signal, said contact piece adapted to connect said power terminal with either of said fixed terminals dependent upon the position of said central member; a brake pedal controlled stop signal switch; and a double acting relay forming automatic means to shunt said contract piece upon an abnormal condition in the connections of said switch to either or both of said rear stop signals, said shunting relay comprising a central armature; a plurality of windings thereon; a pair of make and break contracts, one for each stop signal circuit; and wiring connections from said power circuit to each set of make and break contacts and from said make and break contacts to each of said stop signal circuit connections.

4. In a vehicle, two spaced directional signals; two spaced stop signals at the rear of said vehicle; circuit connections from each of said signals adapted to connect the same to a source of power; a manually settable, automatically releasable directional circuit switch comprising a rotatable central member adapted to be mounted on a steering wheel of an automobile; conducting means thereon to connect said source of power with either of said directional signals; an arc shaped contact carried by said member; a terminal connected with said source of power; a plurality of fixed terminals, one connected with one of said stop signals and the other with the other stop signal, said arc shaped contact adapted to connect said power terminal with either of said fixed terminals dependent upon the position of said central member; a brake pedal controlled stop signal switch; and a double acting relay forming automatic means to shunt said arc shaped contact switch upon an abnormal condition in the connections of said switch to either or both of said rear stop signals, said shunting relay comprising a central armature; a plurality of windings thereon one for each stop signal; a pair of make and break contacts, one for each stop signal circuit; and wiring connections from said power circuit to each set of make and break contacts and from said make and break contacts to each of said stop signal circuit connections, said relay windings adapted to close its corresponding make and break shunting switch when resistance in said arc shaped signal switch or circuit exceeds a predetermined amount.

5. In a vehicle, two spaced directional signals and two spaced stop signals located at the rear of said vehicle; circuit connections from a source of power to each of said signals; a manually settable, automatically releasable directional circuit switch comprising a movable central member; a main directional signal terminal connected with said source of power; a set of terminals for both the right and left hand directional signals; a single automatically operating flashing device in the circuit between said main terminal and the source of power; a contact piece carried by said member; another terminal connected with said source of power; a plurality of stop circuit terminals, one connected with one of said stop signals and the other with the other stop signal, said contact piece adapted to connect said power terminal with either of said stop circuit terminals dependent upon the position of said central member; a brake pedal controlled stop signal switch; and a relay forming automatic means to shunt said stop contact switch upon an abnormal condition in the connections of said switch to either or both of said rear stop signals.

6. In a vehicle, two spaced directional light signals and two spaced stop light signals both sets located at the rear of said vehicle and each comprising separately energizable filament and separately distinguishable when illuminated; circuit connections from a source of power to each of said signals; a manually settable, automatically releasable directional circuit controlling switch comprising a movable central member; conducting means thereon to connect said source of power with either of said directional signal filaments; a single electro responsive flashing means in the circuit between said source of power and said directional signals; means to vary the periodicity of said flashing means; a contact piece carried by said member; a terminal connected with said source of power; a plurality of fixed terminals, one connected with one of said stop signal filaments and the other with the other stop signal filament, said contact piece adapted to connect said power terminal with either of said fixed terminals dependent upon the position of said central member; a brake pedal controlled stop signal switch; and means whereby said stop signal filaments may be directly connected with said source of power upon operation of said brake pedal independently of the circuit including said contact piece.

7. In a vehicle, spaced directional signals; stop signals; a circuit connections from each of said signals adapted to connect the same to a source of power; a manually settable, automatically releasable directional circuit switch in said circuit connections; a stop signal switch in said circuit connections associated with said manually settable switch; a normally open shunt circuit around said manually settable switch; an electrically controlled automatic relay to close said shunt circuit upon an abnormal voltage drop in said manually settable stop signal switching connections.

8. In a vehicle, two spaced directional signals; two spaced stop signals at the rear of said vehicle; circuit connections from each of said signals adapted to connect the same to a source of power; a manually settable, automatically releasable directional circuit switch; a brake pedal control stop signal switch in said circuit connections, said stop signal switch connected with said manually settable switch; a normally open shunt circuit therefor; and a double acting relay forming automatic means to close said shunt circuit upon an abnormal voltage drop in said stop signal switch to either or both of said rear stop signals.

9. In a vehicle having directional and stop signal means, the stop signal indication located at the rear of the vehicle, a source of electrical power; a plurality of conducting leads forming circuit connections interposed between said source of power and said signal means for forming the normal signal energizing circuit from said source of power; a manually settable automatically releasable directional signal switch to control the energization of the directional signal means from said source of power; a brake pedal operated stop signal switch interposed between said source of power and the stop signal means; additional leads to effect a circuit for establishing a normally open auxiliary shunt energizing circuit for said signal means from said source of power; and an electrically controlled automatically operating relay to close said shunt circuit upon an abnormal voltage drop in a connection of the energizing circuit between said source of power and said signal means.

BENJAMIN F. BAILEY.

REFERENCES CITED

The following references are of record in the file of this patent:

UNITED STATES PATENTS

| Number | Name | Date |
| --- | --- | --- |
| 1,468,830 | Ouzoonian | Sept. 25, 1923 |
| 1,647,663 | Pollock | Nov. 1, 1927 |
| 1,973,299 | Swartwout | Sept. 11, 1934 |
| 2,064,735 | Curtiss | Dec. 15, 1936 |
| 2,206,199 | Murray | July 2, 1940 |
| 2,320,641 | Murray, Jr. | June 1, 1943 |
| 2,122,508 | Bell | July 5, 1938 |